US012113311B2

(12) United States Patent
Giesbrecht et al.

(10) Patent No.: US 12,113,311 B2
(45) Date of Patent: Oct. 8, 2024

(54) VARIABLE PLUG CONNECTOR MODULE FOR A MODULAR INDUSTRIAL PLUG CONNECTOR

(71) Applicant: HARTING Electric Stiftung & Co. KG, Espelkamp (DE)

(72) Inventors: Peter Giesbrecht, Porta Westfalica (DE); Thomas Beischer, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 313 days.

(21) Appl. No.: 17/638,974

(22) PCT Filed: Sep. 17, 2020

(86) PCT No.: PCT/DE2020/100806
§ 371 (c)(1),
(2) Date: Feb. 28, 2022

(87) PCT Pub. No.: WO2021/058058
PCT Pub. Date: Apr. 1, 2021

(65) Prior Publication Data

US 2022/0302631 A1 Sep. 22, 2022

(30) Foreign Application Priority Data

Sep. 25, 2019 (DE) ..................... 10 2019 125 856.1

(51) Int. Cl.
*H01R 13/506* (2006.01)
*H01R 4/18* (2006.01)
(Continued)

(52) U.S. Cl.
CPC ............. *H01R 13/506* (2013.01); *H01R 4/18* (2013.01); *H01R 4/183* (2013.01); *H01R 13/42* (2013.01);
(Continued)

(58) Field of Classification Search
CPC ........ H01R 13/506; H01R 4/18; H01R 4/183; H01R 13/42; H01R 13/424; H01R 13/46; H01R 13/502; H01R 13/514
See application file for complete search history.

(56) References Cited

U.S. PATENT DOCUMENTS 6,004,162 A 12/1999 Harting et al.
2003/0194914 A1 10/2003 Duck et al.
(Continued)

FOREIGN PATENT DOCUMENTS

CN 104966934 A 10/2015
CN 107104334 A * 8/2017 ............. H01R 13/04
(Continued)

*Primary Examiner* — Abdullah A Riyami
*Assistant Examiner* — Justin M Kratt
(74) *Attorney, Agent, or Firm* — Smartpat PLC

(57) ABSTRACT

A plug connector module (1, 1') for a modular industrial plug connector has a base body (2, 2'), a holding plate (3, 3') and at least one contact element (4). The at least one contact element (4) has a contact region (4*a*, 4*a*') and a cable connection region (4*b*, 4*b*') and is held by the holding plate (3, 3') in the plug connector module (1, 1'). The base body (2, 2') has at least one cylindrical opening (11) for receiving the contact region (4*a*, 4*a*') of the at least one contact element (4, 4'). The holding plate (3, 3') has at least one cylindrical opening (10) for receiving the cable connection region (4*b*, 4*b*') of the at least one contact element (4, 4').

10 Claims, 2 Drawing Sheets

(51) Int. Cl.

| | |
|---|---|
| *H01R 13/42* | (2006.01) |
| *H01R 13/424* | (2006.01) |
| *H01R 13/46* | (2006.01) |
| *H01R 13/502* | (2006.01) |
| *H01R 13/514* | (2006.01) |

(52) U.S. Cl.
CPC ............ *H01R 13/424* (2013.01); *H01R 13/46* (2013.01); *H01R 13/502* (2013.01); *H01R 13/514* (2013.01)

(56) References Cited

U.S. PATENT DOCUMENTS

| | | | | |
|---|---|---|---|---|
| 2004/0248475 | A1* | 12/2004 | Seminara .................. | F42B 3/26 439/680 |
| 2011/0217880 | A1 | 9/2011 | Schmidt et al. | |
| 2014/0179172 | A1 | 6/2014 | Riepe et al. | |
| 2015/0199603 | A1 | 7/2015 | Troeger et al. | |
| 2015/0280351 | A1 | 10/2015 | Bertsch | |
| 2016/0056567 | A1 | 2/2016 | Dugo | |
| 2016/0093980 | A1 | 3/2016 | Beischer et al. | |
| 2016/0276778 | A1 | 9/2016 | Beischer et al. | |
| 2018/0254578 | A1 | 9/2018 | Herbrechtsmeier et al. | |
| 2019/0237913 | A1 | 8/2019 | Nass et al. | |
| 2020/0036129 | A1* | 1/2020 | Maesoba ............ | H01R 13/5808 |
| 2020/0303866 | A1 | 9/2020 | Andresen | |

FOREIGN PATENT DOCUMENTS

| | | | |
|---|---|---|---|
| DE | 29601998 | U1 | 4/1996 |
| DE | 202010009199 | U1 | 8/2010 |
| DE | 202011050643 | U1 | 8/2011 |
| DE | 202013103611 | U1 | 9/2013 |
| DE | 102012107270 | A1 | 2/2014 |
| DE | 102012110907 | A1 | 5/2014 |
| DE | 102013106279 | A1 | 12/2014 |
| DE | 102015104562 | A1 | 9/2016 |
| DE | 102015114703 | A1 | 3/2017 |
| DE | 102016107412 | A1 | 10/2017 |
| DE | 102016116926 | A1 | 3/2018 |
| DE | 102017123331 | | 3/2019 |
| EP | 1026788 | A1 | 8/2000 |
| EP | 1353412 | A2 | 10/2003 |
| EP | 0860906 | B1 | 5/2004 |
| EP | 2510589 | A1 | 10/2012 |
| EP | 2510590 | A1 | 10/2012 |
| EP | 2979326 | A1 | 2/2016 |
| EP | 2917974 | | 1/2019 |
| EP | 3067993 | B1 | 1/2019 |
| FR | 3065587 | A1 | 10/2018 |
| JP | H1154210 | A | 2/1999 |
| WO | 2018142885 | A1 | 8/2018 |

* cited by examiner

VARIABLE PLUG CONNECTOR MODULE FOR A MODULAR INDUSTRIAL PLUG CONNECTOR

TECHNICAL FIELD

The disclosure relates to a plug connector module for a modular industrial plug connector.

BACKGROUND

Plug connector modules as a component of a plug connector modular system are needed to enable a plug connector, in particular a heavy industrial plug connector, to be flexibly adapted to particular requirements relating to signal and energy transmission, for example between two electrical devices. To this end, plug connector modules are conventionally inserted into corresponding holding frames, which are sometimes also referred to as hinged frames, module frames or modular frames. The holding frames therefore serve to receive a plurality of mutually similar and/or even different plug connector modules and to fasten them securely on a surface and/or a device wall and/or in a plug connector housing or the like.

The plug connector modules generally each have a substantially cuboidal insulating body or a cuboidal housing. These insulating bodies or housings can serve as contact carriers, for example, and receive and secure contacts of various types. The function of a plug connector formed in this way is therefore very flexible. By way of example, pneumatic modules, optical modules, modules for transmitting electrical energy and/or electrical analog and/or digital signals can be received in the respective insulating body or housing and thus be used in the plug connector modular system. Increasingly, plug connector modules also undertake measuring and data tasks.

Holding frames which are optimally used are formed by two frame halves which are connected to one another in a hinged manner. The plug connector modules are provided with approximately rectangular retaining means, also called securing lugs, protruding at the narrow sides. Cutouts, which are formed as openings closed on all sides and into which the retaining means penetrate when the plug connector modules are inserted into the holding frame, are provided in the side parts of the frame halves. To insert the plug connector modules, the holding frame is folded apart, i.e. opened, wherein the frame halves are only folded far enough apart for the plug connector modules to be inserted. The frame halves are then folded together, i.e. the holding frame is closed, wherein the retaining means arrive in the cutouts and secure, form-fitting holding of the plug connector modules in the holding frame is realized.

In the prior art, said plug connector modular systems having such plug connector modules using such a holding frame, also known as holding frames, module frames, hinged frames or modular frames, are disclosed in numerous printed documents and publications, shown at trade fairs and frequently used in the form of heavy load plug connectors in the industrial field. By way of example, they are described in printed documents DE 10 2013 106 279 A1, DE 10 2012 110 907 A1, DE 10 2012 107 270 A1, DE 20 2013 103 611 U1, EP 2 510 590 A1, EP 2 510 589 A1, DE 20 2011 050 643 U1, EP 0 860 906 A2, DE 29 601 998 U1, EP 1 353 412 A2, DE 10 2015 104 562 A1, EP 3 067 993 A1, EP 1 026 788 A1, EP 2 979 326 A1, EP 2 917 974 A1.

A holding frame in the form of a hinged frame for retaining plug connector modules and for installation in plug connector housings or for screwing to wall surfaces is known from the said printed document EP 0 860 906 B1. In this case, the plug connector modules are inserted into the holding frame. Retaining means are provided on the plug connector modules, which retaining means cooperate with windows provided on opposite side parts of the holding frame, wherein the windows consist of cutouts which are formed as openings, closed on all sides, in the side parts of the holding frame.

Printed document DE 10 2015 114 703 A1 discloses such a holding frame. The holding frame disclosed therein has at least one securing means, via which the frame halves can be secured to one another in two positions, an open position and a closed position, which simplifies handling considerably.

For such a plug connector modular system, a multiplicity of different plug connector modules must be provided so that customers can be presented with a wide range of variability. The housings of the individual plug connector modules are all different, which increases the production and storage costs, in particular for plug connector modules which are less in demand.

The German Patent and Trade Mark Office has searched the following prior art in the priority application relating to the present application: DE 10 2017 123 331 B3, DE 10 2016 107 412 A1, DE 10 2016 116 926 A1 and DE 20 2010 009 199 U1.

SUMMARY

The present disclosure provides a plug connector module which can be produced cost-effectively.

The cost-effective production of the plug connector module is achieved in particular in that similar components can be used for different plug connector modules.

The plug connector module is provided for use in a modular industrial plug connector. To this end, a plurality of plug connector modules are generally arranged in succession in an above-mentioned holding frame and the holding frame is then screwed into a plug connector housing.

The plug connector module has a base body, a holding plate and at least one contact element. The plug connector module can also comprise a plurality of contact elements. Where one contact element is mentioned below, the features mentioned can equally apply to a plurality of contact elements in each case.

The contact element has a contact region and a cable connection region. The contact region serves for electrically contacting a contact element of a mating plug connector. In this case, the known pin/socket principle is generally used. The cable connection region of the contact element is configured for electrical contacting of a conductor of a cable. By way of example, the crimping technique is used here. In this case, the cable connection has an opening into which a stripped end portion of the conductor is inserted and then crimped with the aid of a crimping tool.

The base body of the plug connector module has at least one approximately cylindrical opening, depending on the number of contact elements present, for receiving the contact region of the contact element.

The contact element is held in the plug connector module via the holding plate. The holding plate has at least one approximately cylindrical opening, depending on the number of contact elements present, for receiving the cable connection region of the contact element.

The base body and the holding plate can preferably be reversibly latched to one another. The individual parts can thus be reused and new contact elements are simply inserted, for example. Such a plug connector module has, in particular, ecological advantages.

For the reversible latching, the holding plate preferably has latching clips and the base body has latching webs corresponding thereto. Such a latching state can be generated and released again in a simple manner, without tools.

In a particularly advantageous embodiment, the base body is always one and the same component, whilst different holding plates are used for different contact elements. One holding plate preferably has a cylindrical opening with a diameter of approximately 18 mm, whilst another holding plate has a correspondingly larger diameter of approximately 22 mm. The contact regions of the contact elements used are configured identically in each case as a pin or socket contact, whilst the cable connection regions of the contact elements can vary. The base body can therefore be designed identically for different contact elements in the connection region.

The holding plate preferably has securing lugs for securing the plug connector module in a holding frame for a modular industrial plug connector. The plug connector module is provided for transmitting high currents. The contact elements must therefore provide a high current load capacity. The contact elements are configured to be correspondingly compact so that the plug connector module incorporates two plug-in locations in the holding frame.

The plug connector module has a substantially cuboidal basic form. The holding plate has two of the above-mentioned securing lugs on two opposite sides in each case for securing the plug connector module in a holding frame.

BRIEF DESCRIPTION OF THE DRAWINGS

An exemplary embodiment of the invention is illustrated in the drawings and will be explained in more detail below.

DETAILED DESCRIPTION

The figures contain partially simplified, schematic illustrations. Identical reference signs are sometimes used for elements which are similar, but possibly not identical. Different views of similar elements may be drawn to different scales.

Figure 1:
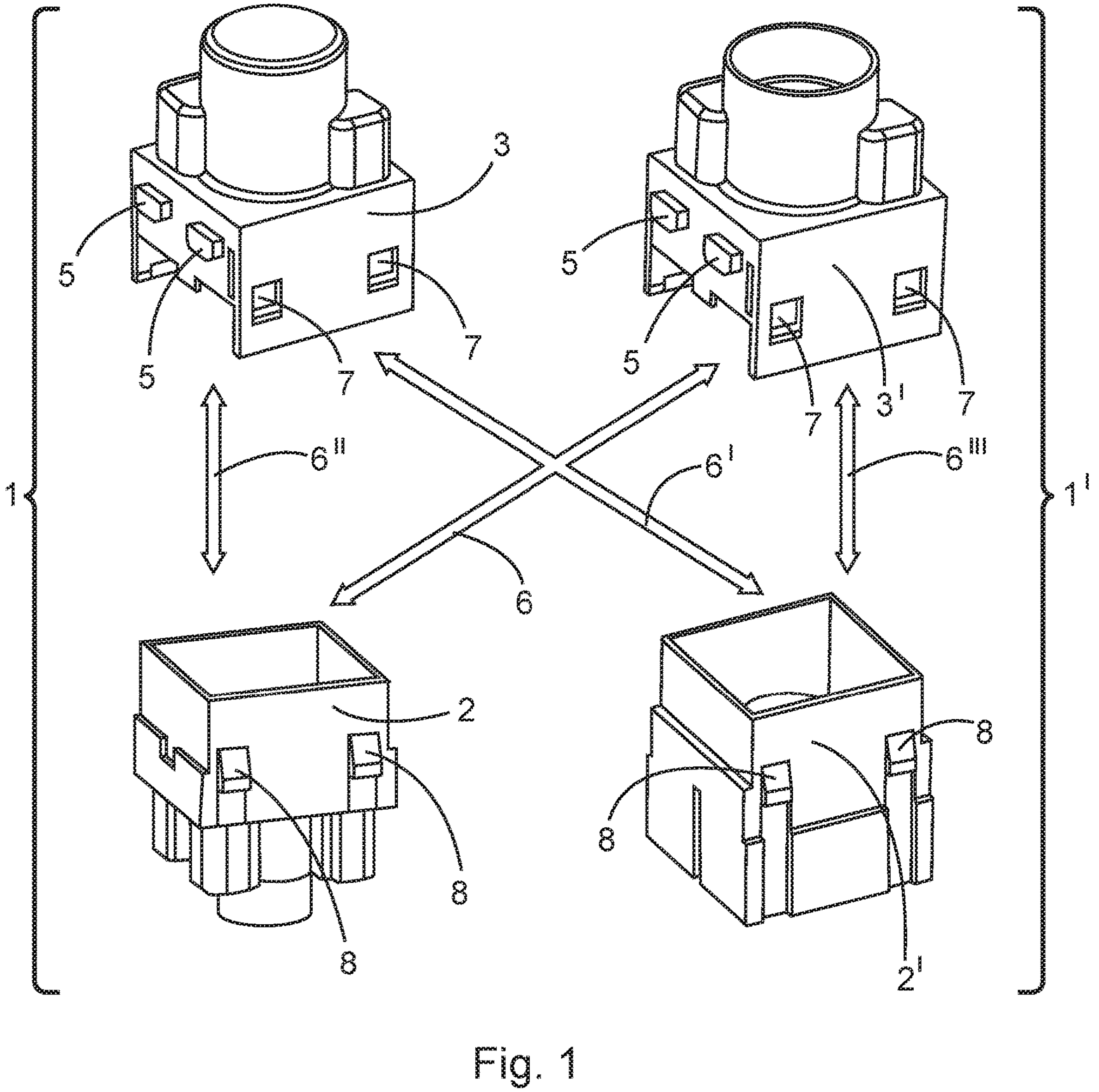
FIG. 1 shows a perspective exploded drawing of two different plug connector modules and FIG. 2 shows a sectional illustration of a plug connector module with a pin and a socket contact.

The plug connector module 1, 1' proposed here is provided for a modular industrial plug connector. The plug connector module 1, 1' consists of a base body 2, 2', a holding plate 3, 3' and at least one contact element 4, 4', which is not shown in FIG. 1 for illustrative reasons.

The base body 2 is configured for a plug connector module having a socket contact element. The base body 2, 2' can be optionally equipped with the holding plate 3 for contact elements 4, 4' having a cable connection region with a cross-section of 25 $mm^2$ up to 70 $mm^2$ or with a holding plate 3' for contact elements 3' for contact elements 4, 4' having a cable connection region with a cross-section of 95 $mm^2$ up to 120 $mm^2$. The possible permutations of the base body 2, 2' and holding plate 3, 3' are symbolized by the double-headed arrows 6, 6', 6'', 6'''. In the base body 2, 2', the contact element 4, 4' is supported in a specifically provided cylindrical opening 11.

Latching clips 7 are integrally formed on the holding plate 3, 3'. The base body 2, 2' has latching webs 8 corresponding to the latching clips 7, During the latching of the base body 2, 2' and holding plate 3, 3', the latching webs 8 engage in the associated latching clips 7. The latching state realized in this way can be easily reversed by removing the latching arms 8 from the latching clips 7.

The base body 2, 2' and the holding plate 3, 3' each consist of plastic material and are produced in an injection molding process.

The plug connector module 1, 1' has a substantially cuboidal basic form with a virtually rectangular cross-section. The holding plate 3, 3' has two securing lugs 5 on two opposite sides in each case for securing the plug connector module 1, 1' in a holding frame (not shown).

Figure 2:
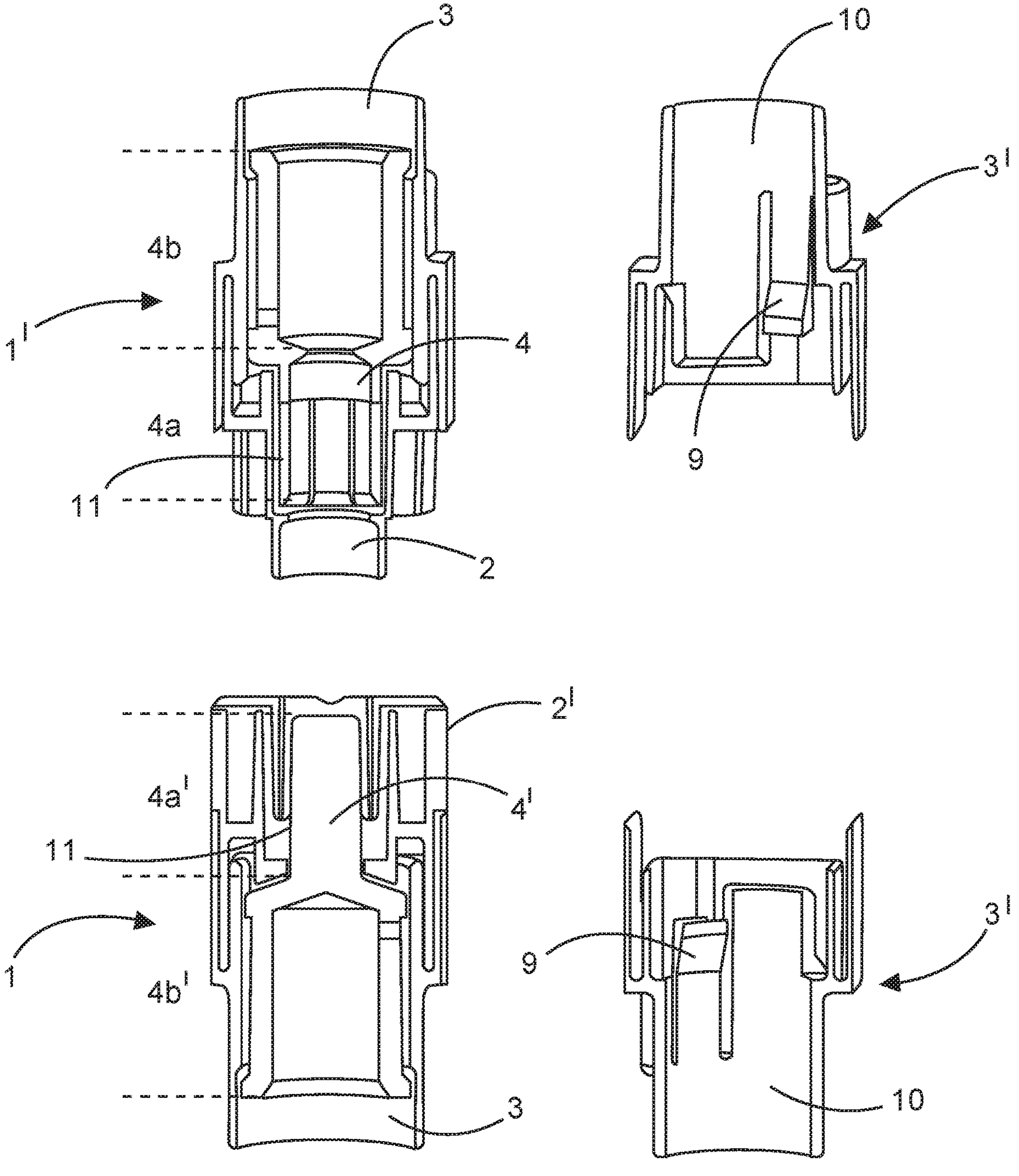

A sectional illustration of a plug connector module 1, 1' having a pin contact 4' and a corresponding plug connector module 1' having a socket contact 4 are shown in FIG. 2. The respective contact element 4, 4' has a contact region **4*a*, 4*a'*. Electrical contact with a corresponding mating contact element, i.e. between the pin contact 4' and the socket contact 4, is represented via the contact region 4*a*, 4*a'***.

The holding plate 3, 3' has internal securing arms 9 for securing the contact element 4, 4'. A holding plate 3, 3' with an appropriately large cylindrical opening 10 is selected according to the size of the cable connection region **4*b*, 4*b'* of the contact element 4, 4'**.

Even where combinations of different aspects or features of the invention are shown in the figures in each case, it is clear to a person skilled in the art—unless indicated otherwise—that the combinations shown and discussed are not the only possible combinations. In particular, mutually corresponding units or feature complexes from different exemplary embodiments can be interchanged with one another.

LIST OF REFERENCE SIGNS

1 Plug connector module
2 Base body
3 Holding plate
4 Contact element
**4*a*** Contact region
**4*b*** Cable connection region
5 Securing lug
6 Double-headed arrow
7 Latching clip
8 Latching web
9 Securing arm
10 Cylindrical opening
11 Cylindrical opening

The invention claimed is:

1. A plug connector module (1) for a modular industrial plug connector, comprising:

a base body (2);

a holding plate (3); and a contact element (4), wherein plates (3, 3'), and wherein the first of at least two different contact elements (4) is a socket contact and the second of the at least two different contact elements (4') is a pin contact (4) has a contact region (**4*a*) and a cable connection region (4*b*) and is held in the plug connector module (1) by the holding plate (3), wherein the base body (2) has an opening (11) for receiving the contact region (4*a*) of the contact element (4), wherein the holding plate (3) has an opening (10) for receiving the cable connection region (4*b*) of the contact element, wherein the holding plate (3) is a first of at least two different holding plates (3, 3') configured to alternatively reversibly latch to the base body (2), and wherein the contact element (4) is a first of at least two different contact elements (4, 4'), a second of the at least two different contact elements (4') being configured to be received in a second of the at least two different holding plates (3, 3'), and wherein the first of the at least two different contact elements (4) is a socket contact and the second of the at least two different contact elements (4'**) is pin contact.

2. The plug connector module as claimed in claim 1, wherein the opening (11) of the base body (2) and/or the opening (10) of the holding plate (3) is/are cylindrical.

3. The plug connector module as claimed in claim 1, wherein the cable connection region (4*b*) of the contact element (4) is formed as a crimp connection.

4. The plug connector module as claimed in claim 1, wherein the holding plate (3) has latching clips (7) and the base body (2) has latching webs (8) corresponding thereto.

5. The plug connector module as claimed in claim 1, wherein the holding plate (3) and the base body (2) consist of plastic material.

6. The plug connector module as claimed in claim 1, wherein the opening (10) of the holding plate (3) has a diameter of 18 mm, and wherein an opening (10') of a second of the at least two different holding plates (3, 3') is 22 mm.

7. The plug connector module as claimed in claim 6, wherein the opening (10) of the holding plate (3) is designed to receive a cable connection region (4*b*) with a cross-section of 25 $mm^2$ up to 70 $mm^2$, and wherein the opening (10') of the second of the at least two different holding plates (3') is designed to receive a cable connection region (4*b*) with a cross-section of 95 $mm^2$ up to 120 $mm^2$.

8. The plug connector module as claimed in claim 1, wherein the holding plate (3) has securing lugs (5) for securing the plug connector module (1) in a holding frame for a modular industrial plug connector.

9. The plug connector module as claimed in claim 1, wherein the holding plate (3) has internal securing arms (9) for securing the contact element (4).

10. A set, comprising:

a first plug connector module (1) for a modular industrial plug connector; and a second plug connector module (1') for the modular industrial plug connector, wherein the first plug connector module (1) comprises a first base body (2), a first holding plate (3), and a first contact element (4), the first contact element (4) having a first contact region (4*a*) and a first cable connection region (4*b*) and being held in the first plug connector module (1) by the first holding plate (3), wherein the first base body (2) has a first opening (11) for receiving the first contact region (4*a*) of the first contact element (4), and wherein the first holding plate (3) has a first opening (10) for receiving the first cable connection region (4*b*) of the first contact element (4), wherein the second plug connector module (1') comprises a second base body (2'), a second holding plate (3'), and a second contact element (4'), the second contact element (4') having a second contact region (4*a'*) and a second cable connection region (4*b'*) and being held in the second plug connector module (1') by the second holding plate (3'), wherein the second base body (2') has a second opening (11') for receiving the second contact region (4*a'*) of the second contact element (4'), and wherein the second holding plate (3') has a second opening (10') for receiving the second cable connection region (4*b'*) of the second contact element (4'), wherein the first base body (2) and the second base body (2') are identical, wherein the first holding plate (3) and the second holding plate (3') are different, and wherein the first contact element (4) is a socket contact and the second contact element (4') is a pin contact.

* * * * *